(12) United States Patent
Ferront et al.

(10) Patent No.: US 10,184,433 B2
(45) Date of Patent: Jan. 22, 2019

(54) EXHAUST GAS MIXER ARRANGEMENT

(71) Applicant: Eberspächer Exhaust Technology GmbH & Co. KG, Neunkirchen (DE)

(72) Inventors: Hervé Ferront, Esslingen (DE); Wei Sang, Esslingen (DE); David Binder, Esslingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 191 days.

(21) Appl. No.: 15/195,013

(22) Filed: Jun. 28, 2016

(65) Prior Publication Data
US 2016/0377033 A1 Dec. 29, 2016

(30) Foreign Application Priority Data
Jun. 29, 2015 (DE) .......... 10 2015 110 426

(51) Int. Cl.
| | |
|---|---|
| *F01N 3/28* | (2006.01) |
| *F02M 26/15* | (2016.01) |
| *F01N 3/20* | (2006.01) |
| *F01N 13/18* | (2010.01) |
| *B01F 5/04* | (2006.01) |
| *B01F 5/06* | (2006.01) |
| *B01F 3/04* | (2006.01) |

(52) U.S. Cl.
CPC ......... *F02M 26/15* (2016.02); *B01F 3/04049* (2013.01); *B01F 5/0473* (2013.01); *B01F 5/0647* (2013.01); *F01N 3/2066* (2013.01); *F01N 3/2892* (2013.01); *F01N 13/1894* (2013.01); *F01N 2240/20* (2013.01); *F01N 2610/02* (2013.01); *Y02T 10/24* (2013.01)

(58) Field of Classification Search
CPC .. B01F 3/04049; B01F 5/0473; B01F 5/0647; F01N 13/1894; F01N 3/2066; F01N 3/2892; F01N 2240/20; F01N 2610/02; F02M 26/15; Y02T 10/24
See application file for complete search history.

(56) References Cited

U.S. PATENT DOCUMENTS

| | | | | |
|---|---|---|---|---|
| 2011/0113758 | A1* | 5/2011 | Perrot ............... | F01N 3/2066 60/295 |
| 2011/0308234 | A1* | 12/2011 | De Rudder ......... | B01F 3/04049 60/295 |

FOREIGN PATENT DOCUMENTS

| | | |
|---|---|---|
| CN | 101999034 A | 3/2011 |
| DE | 10 2011 077 156 A1 | 12/2012 |
| DE | 10 2014 105 836 A1 | 10/2014 |
| FR | 2 891 305 A1 | 3/2007 |
| FR | 2 928 687 A1 | 9/2009 |
| FR | 2 966 513 A1 | 4/2012 |
| FR | 3 010 137 A1 | 3/2015 |
| WO | 2011/110 885 A1 | 9/2011 |

\* cited by examiner

*Primary Examiner* — Brandon Lee
(74) *Attorney, Agent, or Firm* — McGlew and Tuttle, P.C.

(57) ABSTRACT

An exhaust gas mixer arrangement for mixing exhaust gases of an internal combustion engine with an additive comprises an exhaust gas flow duct (28) with an inlet area (24) arranged upstream and with a discharge area (26) arranged downstream. The exhaust gas flow duct (28) is bent in a coil-like manner at least in some areas between the inlet area (24) and the discharge area (26).

13 Claims, 5 Drawing Sheets

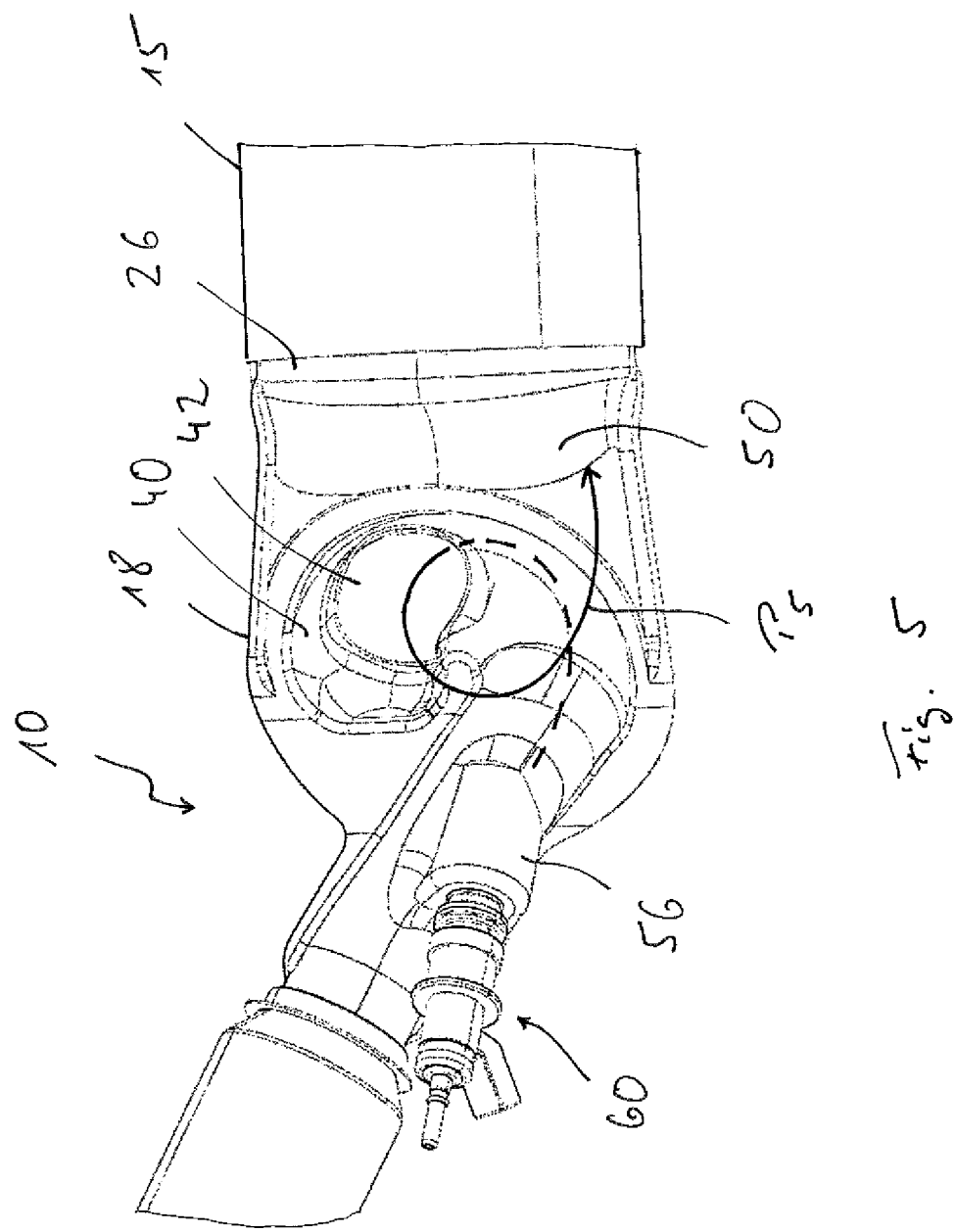

EXHAUST GAS MIXER ARRANGEMENT

CROSS REFERENCE TO RELATED APPLICATIONS

This application claims the benefit of priority under 35 U.S.C. § 119 of German Application DE 10 2015 110 426.1 filed Jun. 29, 2015, the entire contents of which are incorporated herein by reference.

FIELD OF THE INVENTION

The present invention pertains to an exhaust gas mixer arrangement, in which exhaust gases leaving an internal combustion engine, for example, of a motor vehicle, can be mixed with additives, e.g., urea, in order to reduce the emission of harmful substances.

BACKGROUND OF THE INVENTION

In case of the introduction of additives into exhaust gases, it is known to insert exhaust gas mixers with a plurality of wing-like deflecting surfaces into the path of the exhaust gas flow in order to achieve a swirling of the exhaust gases and thus an improved mixing with additives introduced into the exhaust gases.

SUMMARY OF THE INVENTION

An object of the present invention is to provide an exhaust gas mixer arrangement, in which optimal mixing of the exhaust gases discharged from an internal combustion engine with additives introduced into the exhaust gases is achieved with a simple configuration.

According to the present invention, this object is accomplished by an exhaust gas mixer arrangement for mixing exhaust gases of an internal combustion engine with an additive, comprising an exhaust gas flow duct with an inlet area arranged upstream and with a discharge area arranged downstream. The exhaust gas flow duct is bent in a coil-like manner—has coil shape bend—at least in some areas between the inlet area and the discharge area.

By providing an exhaust gas flow duct having a structure bent in a coil shape, a greater mixing section and a swirling because of deflection of the exhaust gases forcibly occurring during the flow of the exhaust gases are obtained without a major increase in the exhaust gas flow resistance developing as a result. If additives are introduced into this area, in which a swirling generated by deflection of exhaust gas forms, improved mixing of the exhaust gases with the additive introduced into them can be achieved without the need to integrate an additional exhaust gas mixer into the flow path.

In order to obtain a compact configuration that nevertheless generates the desired deflection and thus swirling, it is proposed that the exhaust gas flow duct run essentially in a flow duct plane in a first flow duct section following the inlet area and subsequently have a second flow duct section leading out of the flow duct plane at the first flow duct section. As to this, provisions may be made, for example, for a flow deflection in the range of 150° to 210°, preferably about 180°, to take place in the first flow duct section, or/and for a deflection out of the flow duct plane in the range of 70° to 110°, preferably about 90°, to take place in the second flow duct section.

To be able to provide the structure of the exhaust gas flow duct bent with a coiled shape—a coil shape bend—in case of a simple configuration, it is proposed that a mixer housing comprise a central housing part, a first side housing part defining, with the central housing part, a first flow duct area leading away from the inlet area to a passage area and a second side housing part defining, with the central housing part, a second flow duct area leading from the passage area to the discharge area. All three housing parts may thereby advantageously be provided as shaped sheet metal parts which can be connected to one another along corresponding edge areas, for example, by means of spot welding or by means of a laser weld seam.

To be able to establish the flow connection between the two flow duct areas in a simple manner, it is proposed that the passage area comprise at least one passage opening formed in the central housing part. In particular, provisions may be made in this connection for the at least one passage opening to be formed in the area of a cylindrical or funnel-like bulge of the central housing part.

The first flow duct area provided between the central housing part and the first side housing part preferably comprises the first flow duct section and the second flow duct section, i.e., that part of the exhaust gas flow duct, in which, on the one hand, a substantial deflection takes place, but essentially in one flow plane, and then the deflection of the exhaust gases out of the flow plane takes place.

To be able to integrate the exhaust gas mixer arrangement according to the present invention into the generally elongated structure of an exhaust gas duct system in a simple manner, it is proposed that an exhaust gas flow direction in the inlet area correspond essentially to an exhaust gas flow direction in the discharge area.

The exhaust gas mixer arrangement preferably comprises, further, an additive injection arrangement for injecting additive close to the inlet area of the exhaust gas flow duct. It is thus guaranteed that the additive is introduced in an area, which lies upstream of that area or already lies in that area, in which marked swirling is generated due to deflection of the exhaust gases because of the coil-like structure of the exhaust gas flow duct.

The additive injection arrangement is preferably arranged such that the additive injection arrangement injects additive essentially into the first flow duct section. In this connection, when additive is injected essentially in a direction that corresponds to a main flow direction of the combustion waste gases in the exhaust gas flow duct in the area of the additive injection, the additives introduced into the exhaust gases likewise experience a deflection caused by the bent structure of the exhaust gas flow duct for improved mixing with these exhaust gases and are mixed with the exhaust gases in this case.

An especially efficient mixing of the exhaust gases with the additives introduced into these exhaust gases with nevertheless compact configuration of the exhaust gas mixer arrangement according to the present invention can be achieved when the exhaust gas flow duct has essentially a winding (a winding duct path) between the inlet area and the discharge area.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is a partial perspective view corresponding to FIG. 4, in which the second side housing part, shown at a lower portion of FIG. 2 and right most portion of FIG. 3, has been removed.

DESCRIPTION OF THE PREFERRED EMBODIMENTS

Figure 1:
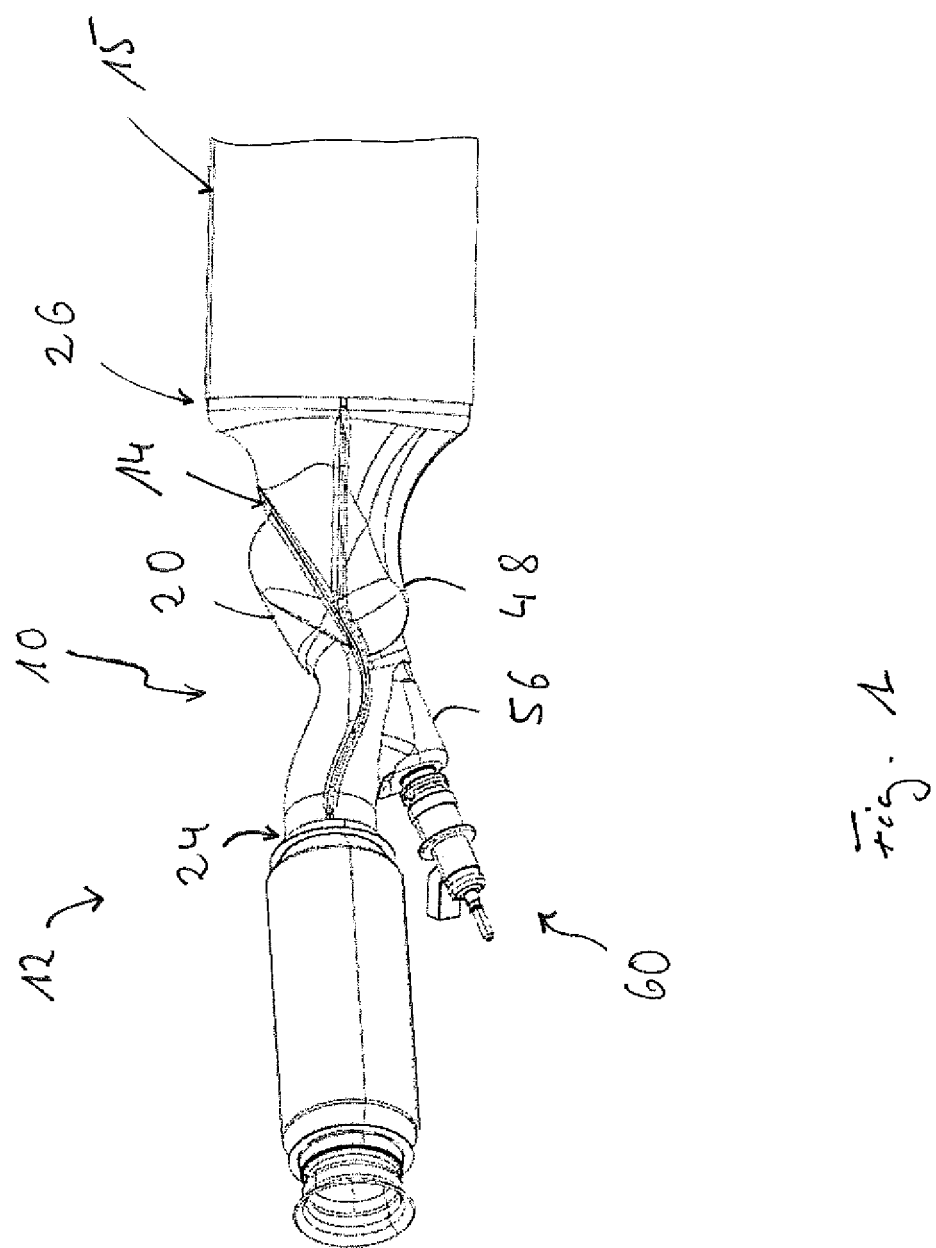
FIG. 1 is an exhaust gas mixer arrangement in an exhaust gas duct system of an internal combustion engine upstream of a catalytic converter arrangement or upstream of a particle filter.

Referring to the drawings, In FIG. 1, an exhaust gas mixer arrangement 10 configured according to the present invention and integrated into an exhaust gas duct system 12 of an internal combustion engine of a vehicle is arranged upstream of a catalytic converter arrangement, generally designated by 15, or upstream of a particle filter. The exhaust gas mixer arrangement 10 comprises a mixer housing 14, which is essentially constructed with three housing parts 18, 20, 48. These three housing parts 18, 20, 48 are shown in various views in FIGS. 2 and 3 and are described in detail below.

Figure 4:
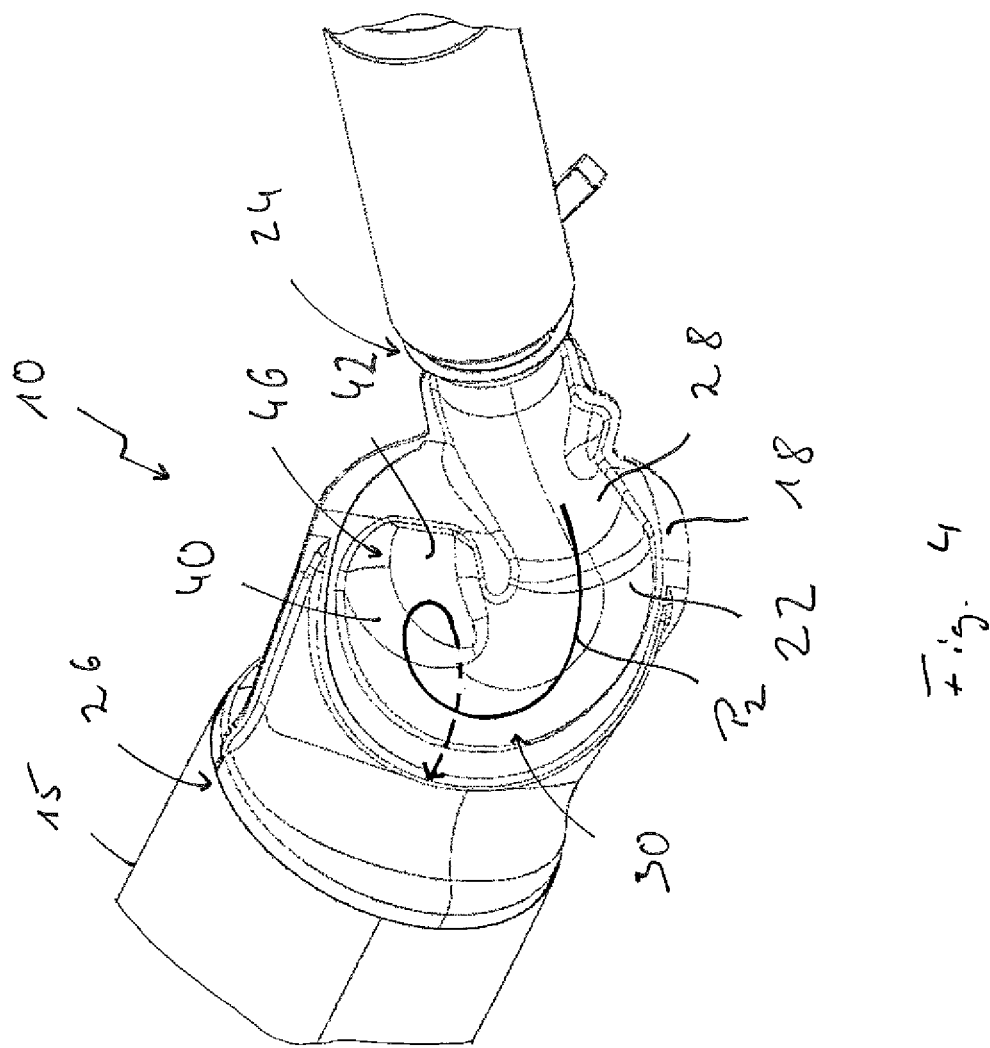
FIG. 4 is a partial perspective view of the exhaust gas mixer arrangement of FIG. 1, wherein the first side housing part, shown at an upper portion of FIG. 2 and left most portion of FIG. 3, has been removed for illustrating flow routing.

A central housing part 18 preferably provided as a shaped sheet metal part together with a first side housing part 20 likewise preferably provided as a shaped sheet metal part defines a first flow duct area, which can be seen in FIG. 4 and is generally designated by 22, of an exhaust gas flow duct 28, which leads from an inlet area 24 to a discharge area 26, of the exhaust gas mixer arrangement 10.

Figure 2:
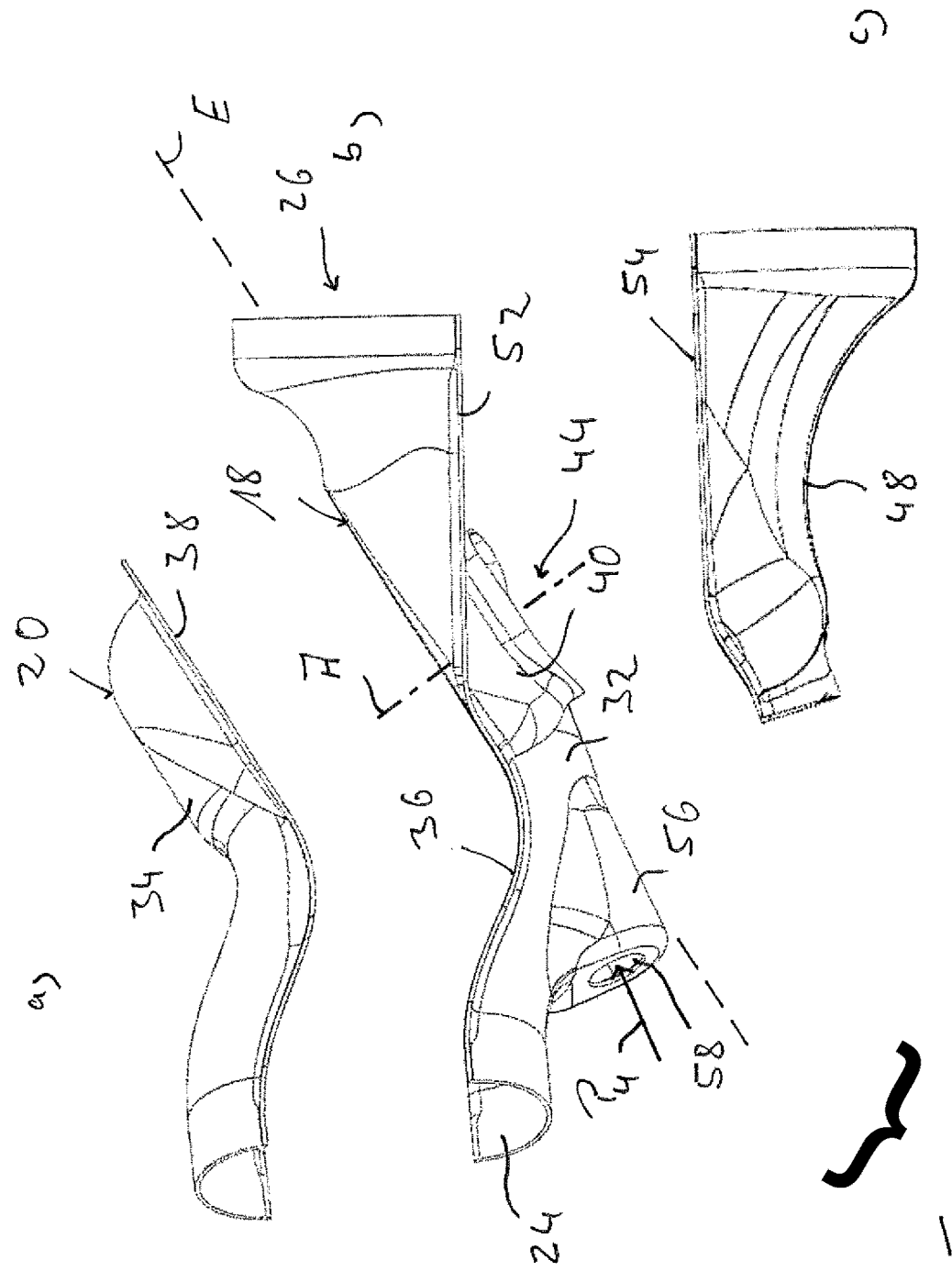
FIG. 2 is an exploded perspective view showing three housing parts that connected to one another form the configuration of the exhaust gas mixer arrangement of FIG. 1.
Figure 3:
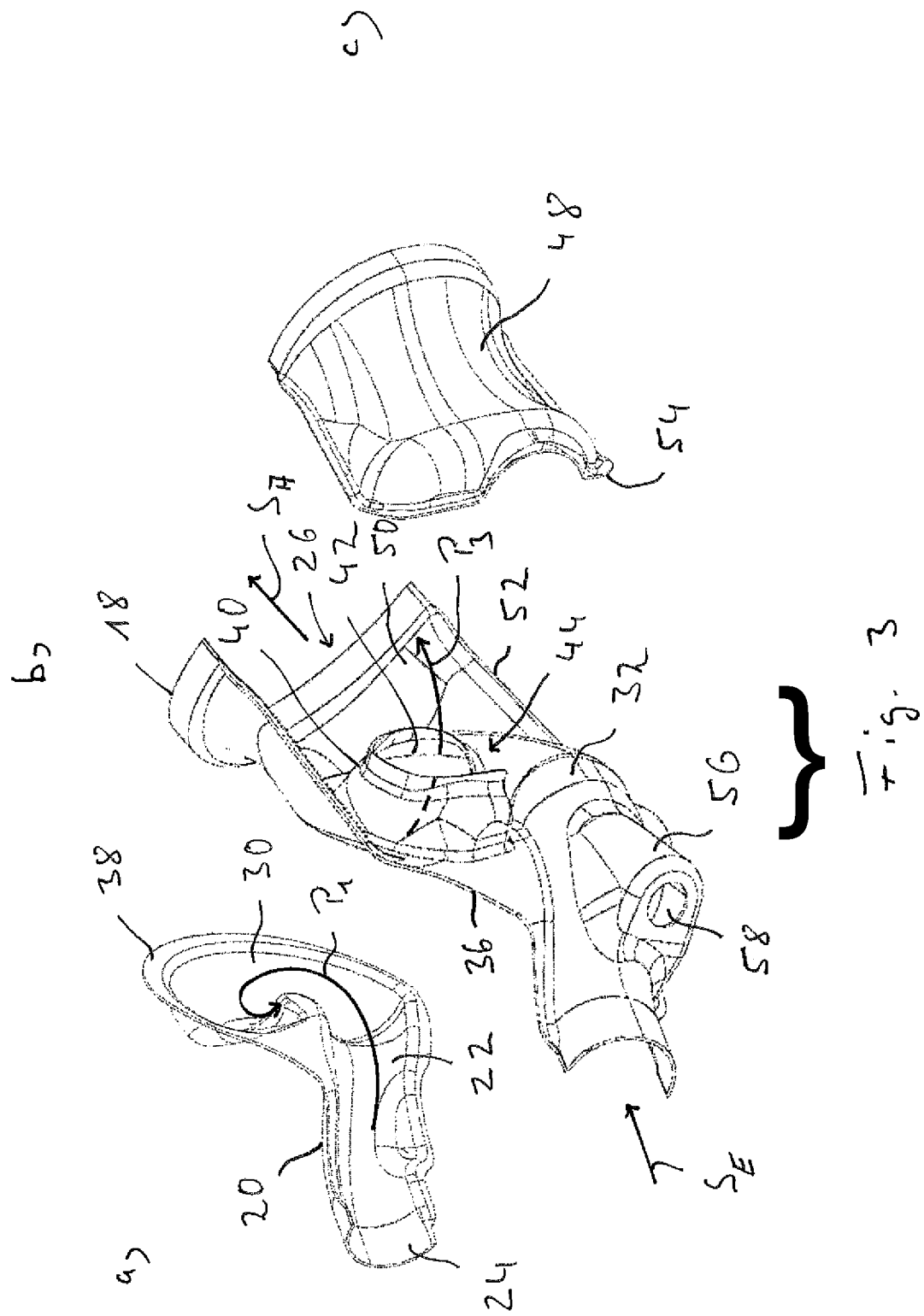
FIG. 3 is another exploded perspective view, taken from a different viewing angle, of the three housing parts of the exhaust gas mixer arrangement.

Following the inlet area 24 providing a duct area extending approximately in a straight line, the first flow duct area 22 comprises a first flow duct section 30, in which the exhaust gas flow, as illustrated by flow arrows $P_1$ in FIG. 3 and $P_2$ in FIG. 4, is deflected by about 180°. This first flow duct section 30 lies, as FIG. 2 illustrates, is essentially in a flow duct plane E. A central thread of the flow, for example, or essentially a geometric cross-sectional central point of the first flow duct section 30 may be considered to be lying essentially in the plane E. In this case, essentially half of the flow cross section of the first flow duct section 30 or of the first flow duct area 22 can be provided or defined by the central housing part 18 by means of shell-like bulges 32, 34 of the central housing part 18 or of the first side housing part 20 and the other half of the flow cross section of the first flow duct section 30 or of the first flow duct area 22 can be provided or defined by the first side housing part 20.

The two housing parts 18, 20 can be connected to one another in a gastight manner, for example, by welding in edge areas 36, 38 configured for mutual contact.

A cylindrical or funnel-like bulge 40, which defines a passage opening 42, leading out of the first flow duct area 22, of a passage area 44, is formed in the central housing part 18 at the end area of the bulge 32 defining the first flow duct section. This bulge 40 essentially defines a second flow duct section 46 of the first flow duct area 22 following the first flow duct section 30 lying essentially in the exhaust gas flow plane E. In this second flow duct section 46 following the first flow duct section 30, the exhaust gases, which are first deflected approximately by 180° in the first flow duct section 30, are led out of the exhaust gas flow plane E, for example, at an angle of about 90°. The flow arrow $P_3$ in FIG. 3 illustrates this.

The exhaust gases flowing through the flow duct section provided in the funnel-like bulge 40 and through the passage opening 42 reach a second flow duct area 50 defined by the central housing part 18 and a second side housing part 48. The second flow duct area 50 thus connects to the first flow duct area 22 and guides the exhaust gases in the direction towards the discharge area 26. In this case, the exhaust gases passing through the passage opening 42 are deflected by the second side housing part 48 (see arrow $P_5$ in FIG. 5) such that the exhaust gases have a discharge flow direction $S_A$ at the discharge area 26, which corresponds approximately to an inlet flow direction $S_E$ at the inlet area 24 (FIG. 3).

The second side housing part 48 and the central housing part 18 may also be connected to each other, in a manner sealed against the discharge of exhaust gases, for example, by welding in the area of edge areas 52, 54 to be positioned opposite one another.

Due to the three housing parts 18, 20, 48, the exhaust gas flow duct 28 is provided with a generally coil-shaped geometry (coil-like, screw-like or helicoid geometry). This coil-shaped geometry has essentially a winding (providing a winding duct path), this winding being guided, for example, about an imaginary winding axis, which is essentially parallel to a central opening axis A (FIG. 2) of the passage opening 42, for example, and with this winding (winding duct path), the exhaust gases are deflected about this imaginary winding axis and in the direction of this winding axis. In this connection, the distance of the exhaust gas flow duct 28, for example, the geometric cross-sectional center thereof or the central thread of the flow, to this imaginary winding axis may be essentially constant or varying in flow direction.

A bulge 56 with an opening 58 is provided at the central housing part 18 in the upstream area of the exhaust gas flow duct 28, i.e., essentially in the area of transition from the inlet area 24 to the first flow duct section 30. An injection nozzle of an additive injection arrangement 60 may be guided through this opening 58 or be inserted into the mixer housing 14. This additive injection arrangement 60 may be used to inject additive, e.g., urea, into the exhaust gas flow in order to thus bring about a reduction in harmful substances due to a corresponding reaction in the catalytic converter arrangement following downstream.

A main injection direction of the additive injection arrangement may correspond to the direction illustrated by the flow arrow $P_4$. It is seen that this site of the additive injection, which is positioned close to the inlet area 24, is arranged such that additive is essentially injected into the upstream part of the first flow duct section 30, and in a direction that also corresponds approximately to the main flow direction of the exhaust gases in the exhaust gas flow duct 28 in this area. The additive thus flows essentially together with the exhaust gases, which are guided in the exhaust gas flow duct 28 in a tangential flow direction, into the first flow duct section 30 deflecting the exhaust gas flow by about 180°. During this deflection, a swirling takes place and thus an intense mixing of the exhaust gases with the additive injected into them such that an essentially homogeneous mixture of exhaust gases and additive exits at the discharge area 26.

With the configuration of an exhaust gas mixer arrangement according to the present invention, an efficient, homogeneous mixing of exhaust gases and additive injected into them is obtained with a structurally simple configuration without a marked increase in the flow resistance occurring thereby. It should nevertheless be pointed out that in the exhaust gas mixer arrangement according to the present invention, an additional mixer, for example, with a plurality of wing-like deflecting surfaces, may be integrated into the exhaust gas flow duct 28 especially downstream of the site of the injection of the additive. Further, it should be pointed out that, of course, one or more of the housing parts shown may also be formed from a plurality of individual parts.

The central housing part 18 forms a separation or a partition between the two flow duct areas 22, 50 in the configuration of the exhaust gas mixer arrangement according to the present invention. In this case, this central housing part 18 may be used as a mixing plate by means of a corresponding configuration, for example, by providing additional bulges as well. Further, with its surface it provides evaporation surfaces, which support the evaporation of additive injected in liquid form. This also applies to the surfaces provided by the side housing parts and surfaces coming into contact with the additives.

While specific embodiments of the invention have been shown and described in detail to illustrate the application of the principles of the invention, it will be understood that the invention may be embodied otherwise without departing from such principles.

What is claimed is:

1. An exhaust gas mixer arrangement for mixing exhaust gases of an internal combustion engine with an additive, the exhaust gas mixer arrangement comprising:
   an exhaust gas flow duct defined in a mixer housing and having an inlet and an outlet downstream of the inlet, wherein the exhaust gas flow duct has a winding duct path between the inlet and the outlet, the mixer housing comprising a central housing part, a first side housing part and a second side housing part, the first side housing part defining, with the central housing part, a first flow duct area leading away from the inlet to a passage opening formed in a cylindrical or funnel-shaped bulge of the central housing part, the second side housing part defining, with the central housing part, a second flow duct area leading from the passage opening to the outlet, wherein the first flow duct area of the exhaust gas flow duct runs in a flow duct plane in a first flow duct section following the inlet and, subsequently to the first flow duct section, the first flow duct area has a second flow duct section leading through the passage opening and out of the flow duct plane; and
   an additive injection arrangement for injecting additive into the first flow duct section, and wherein a deflection of flow in the range of 150° to 210° takes place in the first flow duct section and a deflection out of the flow duct plane in the range of 70° to 110° takes place in the second flow duct section.

2. An exhaust gas mixer arrangement in accordance with 1, wherein an exhaust gas flow direction at the inlet corresponds to an exhaust gas flow direction at the outlet.

3. An exhaust gas mixer arrangement in accordance with claim 1, wherein the additive injection arrangement injects additive at an area of the additive injection close to the inlet area of the exhaust gas flow duct.

4. An exhaust gas mixer arrangement in accordance with claim 3, wherein a main injection direction of the additive injection arrangement essentially corresponds to an exhaust gas flow direction in the exhaust gas flow duct in the area of the additive injection.

5. An exhaust gas mixer arrangement in accordance with claim 1, wherein the central housing part is arranged between the first side housing part and the second side housing part.

6. An exhaust gas mixer arrangement for mixing exhaust gases of an internal combustion engine with an additive, the exhaust gas mixer arrangement comprising:
   a mixer housing comprising an inlet, an outlet, a first side housing part, a central housing part, a second side housing part and an exhaust gas flow duct in fluid communication with the inlet and the outlet, the central housing part comprising a passage opening, the exhaust gas flow duct comprising at least one bend, the outlet being located downstream of the inlet with respect to a flow of exhaust fluid, the first side housing part and the central housing part defining a first flow duct area of the exhaust gas flow duct, the first flow duct area extending away from the inlet to the passage opening, the second side housing part and the central housing part defining a second flow duct area of the exhaust gas flow duct, the second flow duct area extending from the passage opening to the outlet, the second flow duct area being in fluid communication with the first flow duct area via the passage opening; and
   an additive injection arrangement for injecting additive into the first flow duct area, the additive injection arrangement comprising an injector nozzle, the central housing part comprising an injector nozzle receiving opening, at least a portion of the injector nozzle being arranged in the injector nozzle receiving opening, wherein a deflection of flow in the range of 150° to 210° takes place in the first flow duct area and a deflection out of the flow duct plane in the range of 70° to 110° takes place in the second flow duct area.

7. An exhaust gas mixer arrangement in accordance with claim 6, wherein the central housing part comprises a cylindrical or funnel-shaped bulge, the cylindrical or funnel-shaped bulge defining the passage opening.

8. An exhaust gas mixer arrangement in accordance with claim 6, wherein the first flow duct area of the exhaust gas flow duct extends in a flow duct plane in a first flow duct section following the inlet and the first flow duct area has a second flow duct section leading through the passage opening and out of the flow duct plane, the second flow duct section being located downstream of the first flow duct section with respect to the flow of exhaust fluid.

9. An exhaust gas mixer arrangement in accordance with 6, wherein an exhaust gas flow direction at the inlet corresponds to an exhaust gas flow direction at the outlet.

10. An exhaust gas mixer arrangement in accordance with claim 6, wherein a main injection direction of the additive injection arrangement essentially corresponds to an exhaust gas flow direction in the exhaust gas flow duct in the area of the additive injection.

11. An exhaust gas mixer arrangement in accordance with claim 6, wherein the central housing part is arranged between the first side housing part and the second side housing part.

12. An exhaust gas mixer arrangement for mixing exhaust gases of an internal combustion engine with an additive, the exhaust gas mixer arrangement comprising:

a mixer housing comprising an inlet, an outlet, a first side housing part, a central housing part, a second side housing part and an exhaust gas flow duct in fluid communication with the inlet and the outlet, the outlet being located downstream of the inlet with respect to a flow of exhaust fluid, the first side housing part comprising a first side housing part inner surface, the second side housing part comprising a second side housing part inner surface, the central housing part comprising a passage opening, a central housing part first side surface and a central housing part second side surface, the central housing part first side surface being located on one side of the central housing part and the central housing part second side surface being located on another side of the central housing part, the exhaust gas flow duct comprising at least one bend, the first side housing part inner surface and the central housing part side first surface defining the inlet and a first flow duct area of the exhaust gas flow duct, the first flow duct area extending away from the inlet to the passage opening, the second side housing part inner surface and the central housing part second side surface defining the outlet and a second flow duct area of the exhaust gas flow duct, the second flow duct area extending from the passage opening to the outlet; and an additive injection arrangement for injecting additive into the first flow duct area, the additive injection arrangement comprising an injector nozzle, the central housing part comprising an injector nozzle receiving opening, at least a portion of the injector nozzle being arranged in the injector nozzle receiving opening, wherein a deflection of flow in the range of 150° to 210° takes place in the first flow duct area and a deflection out of the flow duct plane in the range of 70° to 110° takes place in the second flow duct area.

13. An exhaust gas mixer arrangement in accordance with claim 12, wherein the first side housing part inner surface comprises at least one first side housing part bent portion, the central housing part first side surface comprising at least one central housing part bent portion, the at least one central housing part bent portion being located opposite the at least one first side housing part bent portion, the at least one first side housing part bent portion and the at least one central housing part bent portion defining the at least one bend of the exhaust gas duct.

* * * * *